United States Patent

[11] 3,625,929

[72] Inventors Eugene C. Stump, Jr.;
 Paul Daniel Schuman; Paul Tarrant, all of
 Gainesville, Fla.
[21] Appl. No. 52,681
[22] Filed July 6, 1970
[45] Patented Dec. 7, 1971
[73] Assignee Calgon Corporation
 Pittsburgh, Pa.

[54] POLYFLUOROALKENYLALKOXY ACRYLATES AND POLYMERS THEREOF
3 Claims, No Drawings

[52] U.S. Cl....................................................... 260/89.5,
 117/126, 117/138.5, 117/138.8, 117/140,
 117/142, 117/148, 117/155, 117/161, 260/63,
 260/80.81, 260/86.1, 260/86.7, 260/486 H
[51] Int. Cl...................................................... C08f 3/62,
 C08f 15/16
[50] Field of Search.......................................... 260/486 H,
 89.5 H, 86.1 R

[56] References Cited
UNITED STATES PATENTS

| | | | |
|---|---|---|---|
| 3,393,186 | 7/1968 | Groves........................ | 260/486 H |
| 3,544,537 | 12/1970 | Brace......................... | 260/486 H |
| 3,527,742 | 9/1970 | Pittman et al................ | 260/486 H |

Primary Examiner—Harry Wong, Jr.
Attorneys—William L. Krayer and Herbert J. Zeh, Jr.

ABSTRACT: This invention is directed to novel polyfluoroalkenylalkoxy acrylate monomers represented by the formula:

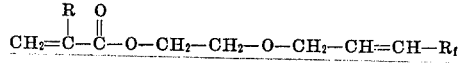

where "R" is H or $CH_3$ and "$R_f$" is a perfluorinated alkyl chain containing three to 14 carbon atoms, and polymers of these monomers which are useful in preparing oil and water repellent coatings.

POLYFLUOROALKENYLALKOXY ACRYLATES AND POLYMERS THEREOF

BACKGROUND OF THE INVENTION

This invention is concerned with the novel composition of certain diunsaturated polyfluoroalkenylalkyoxy acrylates monomers and with polymeric products obtained therefrom.

Monomers and polymers prepared from fluorine containing acrylic and methacrylic acid esters have long been recognized in the art as having utility in giving oil and water repellent finishes to fibers.

Fluorocarbon acrylates of the general formula:

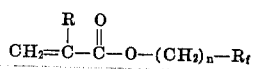

where "$n$" equals 1 to 12 and "$R_f$" is a perfluorinated alkyl group of three to 14 carbon atoms and "$R$" is H or $CH_3$ have been disclosed in numerous patents and literature articles. For example, see U.S. Pat. No. 2,642,416, U.S. Pat. No. 3,102,103 and British Pat. No. 971,732. These prior art compounds cover a large number of monomers and polymers all of which are characterized by a straight chain aliphatic alkyl group between the fluorinated group and the ester oxygen atom. In addition, U.S. Pat. No. 3,393,186 discloses perfluoroalkenylacrylates and methacrylates in which the fluorocarbon radical is separated from the ester oxygen atom by an unsaturated straight chained alkyl group. Finally, Bovey and Abere in an article found in the *Journal of Polymer Science*, Vol. XV, pages 537–543 (1955) disclose fluoroalkyl acrylates and methacrylates in which the fluorinated radical is separated from the ester oxygen atom by an alkyl chain which has an ether linkage in it.

SUMMARY OF THE INVENTION

It is an object of this invention to provide novel perfluorinated acrylates and methacrylates in which the group separating the fluorocarbon radical and the ester oxygen atom contains both an alkyl ether and an alkene grouping. The novel fluorinated monomers of this invention may be more precisely designated as fluoroalkenylalkoxy acrylates and may be represented by the formula:

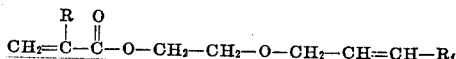

where "$R$" is H or $CH_3$ and "$R_f$" is a perfluorinated alkyl group of from one to 14 carbon atoms. In accordance with this invention, it has also been discovered that the novel fluoroalkenylalkoxy acrylates monomers may be polymerized through the acrylic unsaturation to yield polyfluoroalkenylalkoxy acrylates represented by the repeating group

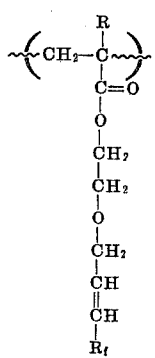

where "$R$" and "$R_f$" are the same as previously defined.

We have found that the small specific class of polyfluoroalkenylalkoxy acrylates of our invention possess good oleophobic and hydrophobic properties. Moreover, the polymers of our invention possess good stability and durability when applied to fabrics and the like.

The monomers of this invention are conveniently prepared by esterification of the respective precursor fluorinated alkenylalkoxy alcohol with acrylic or methacrylic acid. Thus, the monomers are prepared by esterifying acrylic or methacrylic acid with alcohols of the formula:

$$R_fCH=CH-CH_2-O-CH_2-CH_2-OH$$

where "$R_f$" is as previously defined. The precursor alcohols are conveniently prepared by reacting the fluorocarbon iodide $R_fI$ with monoethoxylated allyl alcohol, followed by a dehydroiodination step. The monoethoxylated allyl alcohol may be obtained commercially or by reacting ethylene oxide and allyl alcohol. The synthesis of the monomer may therefore be illustrated by the following reaction scheme:

(I) 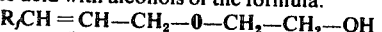

(II) 

(III) 

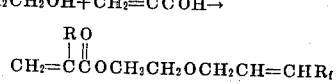

The following examples illustrate the preparation of the monomers of our invention.

EXAMPLE 1

The 2-hydroxyethyl allyl ether (monoethoxylated allyl alcohol) was prepared by allowing allyl alcohol and ethylene oxide to react. Allyl alcohol (10 kg., 172.4 moles) and KOH (50 grams) were put into a 22-liter flask fitted with a stirrer, thermometer, −78° C. reflux condenser vented through a −183° C. trap, and a gas inlet tube from an ethylene oxide cylinder with the opening beneath the surface of the allyl alcohol after passing through a backup trap. (Care should be taken so that the ethylene oxide is not added as a gas above the surface of the reaction mixture because of the possibility of a vapor phase explosion initiated by static electricity.) The allyl alcohol was heated to 80° C. and then external heating was discontinued as the ethylene oxide was bubbled in as fast as possible without causing reflux from the −78° C. condenser. The heat of reaction was maintained between 90° to 100° C. The ethylene oxide (6,481 grams, 147.3 moles) was added over a 24 hour period after which the mixture was distilled. The fraction, boiling at 158°–166° C, was redistilled on a glass packed vacuum jacketed column to give 3,105 grams of 2-hydroxyethyl allyl ether (b.p. 160° C.) which had a purity of 99 percent as determined by gas liquid chromatography.

The 2-iodo-3-(perfluoroalkyl)propyl(2-hydroxyethyl)ether intermediate was then prepared by allowing the perfluoroalkyl iodide to react with the 2-hydroxyethyl allyl ether. The perfluoroalkyl iodide used was a mixture of telomer iodides which had the general structure $C_2F_5(C_2F_4)_xI$ and a distribution of $x<3$, 2.9 percent; $x=3$, 81.9 percent; $x=4$, 12.7 percent; $x=5$, 0.33 percent and inerts of 2.2 percent. Analysis by percent iodine showed an average molecular weight of 556. The telomer iodide (2,911 grams, 5.236 moles), 1,120 grams of the 2-hydroxyethyl allyl ether (10.98 moles) and 3,000 ml. of ethyl acetate were put into a 12 liter flask fitted with a reflux condenser and stirrer. The mixture was heated to reflux and 42.5 grams of azobisisobutyronitrile was added in 2.5 gram increments at 2 hour intervals. Aliquots of the reaction mixture were withdrawn at random intervals. These samples were put under vacuum to remove the ethyl acetate and then reacted with an excess of 20 percent KOH in CH₃OH to form the 3-fluoroalkylallyloxy 2'-hydroxyethyl ether. This sample was washed several times with H₂O and then analyzed for iodine. The presence of residual iodine in the aliquot indicates that the addition of the telomer iodide to the hydroxyethyl allyl ether is not complete. The reaction mixture was refluxed until the analysis for iodine showed less than 0.2 percent, at which time the reaction was considered complete. The total reaction time was 3 days for the step.

The 3-fluoroalkylallyloxy 2'-hydroxyethyl ether was prepared by dehydroiodination of the 2-iodo-3-fluoroalkylpropyl 2'-hydroxyethyl ether with alcoholic KOH. The reaction mixture from the addition of the telomer iodide to the hydroxyethyl allyl ether was stripped of most of the ethyl acetate while maintaining the mixture at a pot temperature of less than 120° C. The residue was cooled to ambient temperature and 4,300 ml. of a 20 percent KOH in CH₃OH was added and the mixture was stirred for 16 hours. This was followed by the addition of 6,000 ml. H₂O which resulted in a mixture containing two liquid layers. The bottom layer was separated and washed with 5 percent H₂SO₄ until the washings tested acid. The 3-fluoroalkylallyloxy 2'-hydroxyethyl ether was then isolated and used in the next step to form the 2-(3-fluoroalkylallyloxy) ethyl acrylate.

The unsaturated perfluoro alcohol (1,807 grams) prepared above was put into a 5 liter flask fitted with a stirrer and Barrett trap with a reflux condenser. Then 1,747 ml. of benzene, 20 grams of copper powder, 313 grams of acrylic acid and 20 grams of H₂SO₄ were added to the reaction flask. The mixture was refluxed for 19 hours. At the end of this time, no H₂O had evolved from the reaction mixture for over 3 hours. The mixture was cooled and 146 grams of Ca(OH)₂ was added and the reaction mixture stirred for 2 hours. The mixture was then filtered into a flask containing 10 grams of copper powder. It was then put under vacuum and the benzene was removed to leave the 2-(3-fluoroalkylallyloxy) ethyl acrylate monomer.

EXAMPLE 2

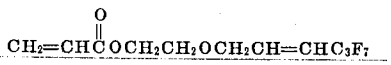

was prepared using the following reaction sequence:

(I)  $C_3F_7I + CH_2=CHCH_2OCH_2CH_2OH \rightarrow$ $C_3F_7CH_2CHICH_2OCH_2CH_2OH$ (II)  $C_3F_7CH_2CHICH_2OCH_2CH_2OH \xrightarrow{-HI}$ $C_3F_7CH=CHCH_2OCH_2CH_2OH$ (III)  $C_3F_7CH=CHCH_2OCH_2CH_2OH + CH_2=CHCOOH \rightarrow$

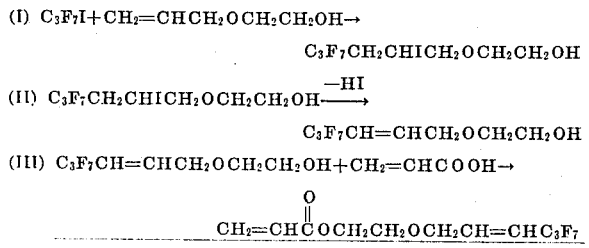

The procedure used was similar to that described in example 1. The heptafluoropropyl iodide was reacted with the monoethoxylated allyl alcohol to form the iodo perfluoroalkylpropyl hydroxyethyl ether intermediate. The heptafluoropropyl iodide, the 2-hydroxyethyl allyl ether, and ethyl acetate were acetate were placed into a flask fitted with a reflux condenser and stirrer. The mixture was heated to reflux and azobisisobutyronitrile was added incrementally at about 2 hour intervals. Aliquots of the reaction mixture were withdrawn at intervals and analyzed to determine the extent of the reaction. The method used was the same as described in example 1. When analysis indicated that the reaction was complete the mixture was cooled to room temperature. The total reaction time was about 3 days.

The iodofluoroalkyl propyl hydroxyethyl ether intermediate was then subjected to a dehydroiodination reaction. The iodo intermediate from step 1 above was stripped of most of the ethyl acetate while maintaining the pot at a temperature of less than 120° C. When the ethyl acetate had been removed, the residue was cooled to room temperature and 20 percent KOH in methanol was added and the mixture stirred. The reaction was essentially complete after a few hours. The 3-heptafluoropropylallyloxy 2'-hydroxyethyl ether was recovered by adding water to the mixture, separating the bottom layer and acid washing it.

The 2-(3-heptafluoropropylallyloxy) ethyl acrylate was then prepared by reacting the 3-heptafluoropropyl allyloxy 2'-hydroxyethyl ether with acrylic acid. The unsaturated heptafluoro alcohol from step 2 above was put into a flask fitted with a stirrer and a Barrett trap with a reflux condenser. Then benzene, copper powder, acrylic acid, and concentrated H₂SO₄ were added to the reaction flask. The mixture was refluxed for about 20 hours. At the end of this time, no H₂O had evolved from the reaction flask for over 3 hours of refluxing. However, the reaction had only proceeded to about 75 percent completion and stopped. The acrylic acid was entirely consumed even though it was originally present in a 2:1 molar excess. The reaction mixture was deep green, indicating the presence of copper ion probably in the form of copper acrylate. The copper acrylate was removed and replaced with fresh acrylic acid and fresh sulfuric acid. This resulted in a complete consumption of the unsaturated heptafluoro alcohol. The mixture was cooled and Ca(OH)₂ was added and the reaction mixture stirred for 2 hours. The mixture was then filtered into a flask containing 10 grams of copper powder. It was then put under vacuum and the 2-(3-heptafluoropropylallyloxy ethyl acrylate monomer was isolated.

EXAMPLE 3

Another sample of the 2-(3-perfluoroalkylallyloxy) ethyl acrylate monomers of this invention was prepared using the following reaction sequence:

(I)  $R_fI + CH_2=CHCH_2OCH_2CH_2OH \rightarrow$ $R_fCH_2CHICH_2OCH_2CH_2OH$ (II)  $R_fCH_2CHICH_2OCH_2CH_2OH \xrightarrow{-HI}$ $R_fCH=CHCH_2OCH_2CH_2OH$ (III)  $R_fCH=CHCH_2OCH_2CH_2OH + CH_2=CH\overset{O}{\overset{\|}{C}}OH \rightarrow$

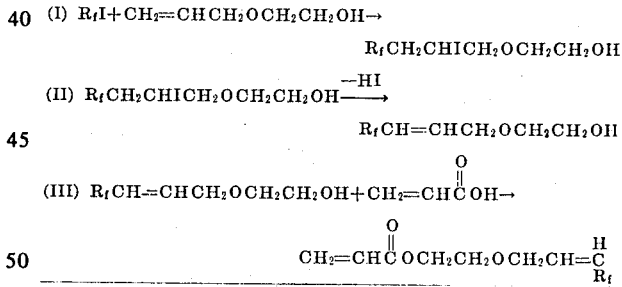

The procedure used was similar to that described in examples 1 and 2 above.

STEP 1

Addition of R_fI to Ethoxylated Allyl Alcohol

Ethoxylated allyl alcohol (1,000 grams), telomer iodide (2,480 grams) and methyl ethyl ketone (MEK) (2,300 grams) were charged into a 12-liter flask fitted with stirrer, thermometer and condenser. Then azobisisobutyronitrile was added incrementally at the rate of 5 grams every 2 hours. The initial catalyst increment was added as a solid while subsequent additions were made via a solution of the catalyst in MEK. The reaction mixture was heated to reflux (88° C.) and maintained there until the telomer iodide was consumed. The telomer iodide consumption was followed by a gas chromatographic technique. The reaction was essentially complete after 38 hours of reflux. During this time the reaction mixture changed from a water white to a deep red solution with a small amount of solids present. The telomer iodide used was a mixture of straight chained perfluorinated alkyl iodides. The mixture was assayed to have the following composition: less than eight carbon atoms about 2 to 4 percent by weight, eight carbon atoms about 80 to 85 percent by weight, greater than eight carbon atoms about 11 to 20 percent by weight.

STEP 2

Dehydroiodination

The reaction mixture from step 1 was filtered and stripped similarity of boiling point, ease of substitution into the reaction sequence, polarity, and unreactivity toward the telomer iodide and the addition product. The catalyst and catalyst concentrations were held constant to eliminate the possible effects of this variable. The catalyst was azobisisobutyronitrile. The results are shown in table 1 in which the solvents are listed with the conversion of the telomer iodide. Gas chromatography was used to follow the reactions.

TABLE 1.—PERCENT UNREACTED TELOMER IODIDE IN REACTION MIXTURE

| Time in hours | Ethyl acetate | MEK | Ethoxylated allyl alcohol | Acetone | t-BuOH | Methanol | Benzene |
|---|---|---|---|---|---|---|---|
| 0 | 100 | 100 | 100 | 100 | 100 | 100 | 100 |
| 24 | 25 | 25 | 39 | 41 | 61 | 67 | 75 |
| 48 | 2 | 5 |  | 19 | 43 |  | 56 |
| 60 | 0 | 0 | 29 |  | 22 | 43 |  |
| 72 |  |  |  |  | 17 |  |  |
| 96 |  |  |  |  | 11 |  |  |
| 120 |  |  | 15 |  | 5 |  |  |
| 144 |  |  | 13 |  | 2 | 8 | 27 |
| 168 |  |  |  |  | 1 | 5 | 18 |
| 192 |  |  |  |  |  | 2 |  |
| 216 |  |  |  |  |  | 0.4 |  | down to about one-half of its original volume. It was then placed in a 12-liter flask fitted with stirrer, thermometer and condenser and placed in an ice bath. A methanolic potassium hydroxide solution (786 grams KOH in 3,154 grams methanol) was added slowly, keeping the temperature below 25° C. during the entire addition. The addition took approximately 7 hours. After about 1 liter of the KOH solution was added, potassium iodide began to form and continued to fall out of solution. After the addition of the alcoholic KOH solution was completed, the reaction mixture was stirred overnight to insure complete reaction. To this reaction mixture was added water, which dissolved all of the potassium iodide and resulted in two layers, the lower layer being the desired unsaturated alcohol. The fluorocarbon layer was recovered, then extracted with 5 percent sulfuric acid until the washings were acidic, and then extracted with water until neutral. The yield was 2,310 grams of the unsaturated alcohol or a 99.5 percent yield for the first two steps.

STEP 3

Esterification

The unsaturated alcohol from step 2 (2,310 grams) was charged into a 12-liter flask fitted with a stirrer, thermometer, and a Barrett trap fitted with a condenser. Then 4,000 grams of benzene (4,550 ml.), 1,310 grams acrylic acid and 38 grams of copper dust were added to the flask. Then 150 grams of p-toluene sulfonic acid was added incrementally to the reaction mixture. About 15 grams of p-toluene sulfonic acid was added about every 4 hours. The reaction mixture was heated to reflux (approximately 80° C.) and the water azeotrope collected. The reaction was very slow requiring a total of 163 hours at reflux. The resulting monomeric solution was deep brown. Completeness of the reaction was judged via gas chromatography, in which those peaks attributed to the unsaturated alcohols were followed until they were negligible. Once the reaction was complete, the mixture was filtered to remove the copper dust and any polymer that had formed and then neutralized with calcium hydroxide to a pH of 6.7. The mixture was filtered again and the filtrate stripped of solvent to yield the monomer. The yield for the esterification step of the reaction was 69.5 percent.

As can be seen from the example, steps 1 and 3 are time-consuming and inefficient, while step 2 is fast and efficient. In order to improve the process for making the monomers of this invention, a series of reactions were run to try to improve steps 1 and 3.

Step 1

Various suitable solvents were selected and tested for the addition reaction. The criteria for selection included the The results of the study showed that ethyl acetate or methyl ethyl ketone were the best solvents. No side reactions were observed with the use of either of these two solvents. Most of the other solvents indicated a much slower rate of reaction or excessive color and side reactions and were thus eliminated. Based on these results, steps 1 and 2 of the reaction sequence were repeated using ethyl acetate and methyl ethyl ketone. The results are shown in table 2.

TABLE 2

| Solvent | Percent yield of Unsaturated Alcohol |
|---|---|
| Ethyl Acetate | 96.0 |
| Methyl Ethyl Ketone | 96.5 |

As can be seen from the results shown in table 2 along with the results from the Table 1, both ethyl acetate and methyl ethyl ketone are good solvents and either one can easily be used.

Step 3—Esterification

A series of experiments were designed to study the variables of the esterification step of the reaction sequence. The purpose of these experiments were to optimize the yield, improve the color, and increase the polymerizability of the monomer.

All esterifications were run with the same batch of unsaturated alcohol. The variables of the reaction which were considered were the acrylic acid concentration, solvent and temperature effects, catalyst type and concentration, inhibitor side reactions and the use of methacrylic acid instead of acrylic acid. Each reaction was followed via gas chromatography by comparing the peak area ratios of the unreacted unsaturated alcohol to that of the unsaturated ester. The reactions were considered complete when no unsaturated alcohol was detectable. The reactions were judged by the final color, signs of any side reactions (odor, color, etc.) and the rate of esterification.

Effect of Acrylic Acid Concentration

In experiments using a 2:1 acrylic acid to alcohol molar ratio, gas chromatographic analysis indicated that the acid disappeared during the reaction, either leaving an amount too small to drive the esterification to completion, or no acrylic acid was left at all. Some acrylic acid was observed to have polymerized; the rest was lost in side reactions. The acrylic acid concentration was increased to 4 moles to every 1 mole of unsaturated alcohol. The reaction time was less than 6 hours and nothing extraordinary was observed in the gas chromatographic analysis. Because of the accelerating effects of the excess acrylic acid, the 4:1 ratio was used in all further work.

Effect of Solvent and Temperature

Esterifications were run in benzene, carbon tetrachloride and toluene. After 3½ hours, the reaction in benzene was 87 percent complete, in toluene 97 percent complete and in carbon tetrachloride 94 percent complete. After 6 hours of reaction time, all three had completely esterified. The physical appearance of the final monomers was the same and analysis showed no difference among the three products. The temperature effects of the above solvents were considered along with one low temperature reaction refluxed under partial vacuum in benzene at 40° C. The higher temperature reactions did proceed faster than the one refluxed at 40° C., which was only 25 percent complete after 4 days of reaction time. The three higher temperature rates of reaction showed little difference in reaction time. After examining the various solvents and temperatures of reaction, the original solvent, benzene, was judged satisfactory and used in all further work. However, the substitution of one of the other solvents would not affect the reaction.

Catalyst Type and Level

Milder catalyst types were examined in order that the $H_2SO_4$ catalyst could be replaced. The recommended level for $H_2SO_4$ concentration was 135 milliequivalents acid per mole of alcohol. Before other catalysts were tested, however, the threshold level of $H_2SO_4$ was determined in order that less catalyst might give a cleaner reaction. Two reactions were set up. One esterification was initiated using 13.5 milliequivalents $H_2SO_4$. This reaction was complete in 40 hours, but the product was the same deep orange/brown color as found with higher concentrations of $H_2SO_4$. The second reaction was started with 1.35 milliequivalents $H_2SO_4$. This catalyst level was not effective after 15 hours, so another 1.35 milliequivalent addition was made. After 40 hours, this reaction was 42.5 percent complete and was yellow. Similar 1.35 milliequivalent incremental additions of catalyst were made over a 100 hour period. A total of 7.3 milliequivalents of catalyst was used giving a light yellow/orange monomer. New catalysts were initially used at a 135 milliequivalent concentration. If the reaction results were promising, then lower levels were tested. Substitute catalysts that were tried were several organic titinates, ion exchange beads and para toluenesulfonic acid. The organic titinates imparted a bright red color to the reaction mixture upon their addition. After 100 hours of refluxing, less than 25 percent of the alcohol had been esterified even though more catalyst was added to the reaction. The ion exchange beads initiated a very slow reaction with good color, but most of the acrylic acid polymerized during the esterification reaction. The para toluenesulfonic acid proved to be the best catalyst.

Effect of Acrylic Acid vs. Methacrylic Acid

These reactions used the 4:1 ratio of acid to alcohol and a 13.5 milliequivalent level of para toluenesulfonic acid. The acrylic acid esterification was complete in 36 hours, but resulted in a clear brown/red monomer. The methacrylic acid reaction took 48 hours and was a clear orange monomer.

Effect of Polymerization Inhibitor

When hydroquinone was used as the inhibitor and combined with acrylic acid, benzene and $H_2SO_4$ and heated, the mixture turned deep brown. If the polymerization inhibitor was omitted the solution remained clear. These results indicated part of the color problem was caused by a side reaction of the inhibitor. Copper dust and cuprous chloride were substituted as inhibitors. The cuprous chloride reaction turned a brown/green and the copper dust produced a clear light orange monomer. Copper dust was then considered as an adequate polymerization inhibitor.

The monomers of our invention made in the manner described above are readily homopolymerized and copolymerized by methods known in the art. They may be bulk polymerized, solution polymerized and emulsion polymerized using catalysts such as the peroxides or other free radical type polymerization initiators.

Some of the applicable copolymerizable monomers include (1) acrylic acid, methacrylic acid and the esters of acrylic acid and methacrylic acid such as the methyl, ethyl, butyl, propyl, hexyl, 2-ethylhexyl, decyl, lauryl stearyl and glycidyl esters; (2) vinyl esters such as vinyl acetate, vinyl laurate, vinyl stearate and the like; (3) styrene, and methyl styrene; (4) acrylamide, methacrylamide N-methylol acrylamide, diacetone acrylamide and other N-substituted acrylamides.

Of the polymerization methods referred to above, the most common and the preferred method is the emulsion polymerization. The conventional emulsion technique used to polymerize most acrylic esters is applicable. For example, one or more of the monomers to be polymerized is emulsified in a suitable suspending media having dissolved therein an emulsifying agent and a free radical catalyst. The emulsifying agents may be anionic, cationic or nonionic surfactants. For example, some of the anionic surfactants are the sodium alkyl sulfonates, or sodium alkyl benzene sulfonates. Some of the useful cationic surfactants include the fatty alkyl quaternary ammonium compounds such as dodecyl trimethyl ammonium chloride and other quaternary ammonium compounds such as benzyl dodecyl dimethyl ammonium chloride and the like.

The free radical initiator useful in this invention are well-known and used in the art. They include benzoyl peroxide, azobisisobutyronitrile, potassium persulfate, ammonium persulfate and the like.

The polymerization temperature may be varied over a wide range depending on the kind of monomer, initial concentration, emulsifier, catalyst and catalyst concentration. A temperature in the range of from 0° to about 100° C. is usually employed.

The resulting polymers are valuable as oil and water repellent treatments for substrates. Generally speaking, the molecular weight is not critical. However, we have found that for all practical purposes a minimum molecular weight of 1,000 is desirable. Fibrous and porous surfaces may be treated with the polymers of our invention to render them oil and water repellent. For example, some of the articles which may advantageously be treated with the polymers of our invention are woven fabrics or cloth, felt, paper, wood, leather, asbestos, carpeting, shoes, draperies, and the like.

The following examples illustrate the preparation of the polymers of our invention.

EXAMPLE 4

In a 4-necked flask fitted with a thermometer, condenser and stirrer was charged the following reaction mixture: 24.5 grams of monomer prepared in the manner described in example 3, 35.3 grams of distilled water, 8.8 grams of acetone and 1.96 grams of surfactant CATANAC SN. The reaction mixture was stirred rapidly and heated to 60° to 65° C. The reaction mixture was then purged for 1 hour with nitrogen to remove any dissolved oxygen. Ammonium persulfate catalyst was added and the mixture stirred rapidly for 6 hours. The amount of catalyst was 1.2 percent based on the amount of monomer present. The result was a homopolymer of the unsaturated acrylate of our invention. This polymer was tested at different add-on weights for its water and oil repellency properties. The test used for water repellency was a modified AATCC spray test (22–1967) and the test used for oil repellency was the AATCC oil repellency test (118–1966T). The results are shown in the following table. The water repellency was rated on a relative scale of excellent (E), good (G), fair (F), poor (P) and none (O).

| Add-on Weight | Oil Repellency Rating | Water Repellency Rating |
| --- | --- | --- |
| 5 | 5 | G |
| 2.5 | 5– | F |
| 1.25 | 4 | F |
| 0.63 | 0 | F |

EXAMPLE 5

A polymer was prepared using the method described in example 4 except that the acetone was replaced by a similar amount of methanol. The remaining reaction variables were the same. The result was a homopolymer of the unsaturated acrylate having the following repellency properties:

| Add-on Weight | Oil Repellency Rating | Water Repellency Rating |
|---|---|---|
| 5 | 5— | G |
| 2.5 | 4 | G |
| 1.25 | 3 | P |
| 0.63 | 2 | 0 |

EXAMPLE 6

A polymer was prepared using the method described in example 4 except the monomer concentration of the reaction mixture was increased to 34.1 percent. All other reaction variables were the same. The result was a homopolymer of the unsaturated acrylate having the following repellency properties:

| Add-on Weight | Oil Repellency Rating | Water Repellency Rating |
|---|---|---|
| 5 | 5 | G |
| 2.5 | 5— | G |
| 1.25 | 4— | F |
| 0.63 | 2 | F |

The following table illustrates a series of polymers prepared in a manner similar to example 4.

TABLE 3

| Example | Surfactant | Surfactant type | Percent solvent | Percent monomer solids | Temp. | Percent catalyst |
|---|---|---|---|---|---|---|
| 7 | Triton X405 | N | 20% acetone | 31.4 | 65–70 | 0.4 |
| 8 | Sodium lauryl sulfate | A | 12.6% acetone |  | 70–75 | 1.2 |
| 9 | Triton X305 | N | 20% acetone | 21.1 | 65–70 | 1.2 |
| 10 | do | N | 7.6% methanol | 15.8 | 65–75 | 1.2 |
| 11 | do | N | do | 9.8 | 65–75 | 0.4 |
| 12 | SLS/Triton X305 | A/N | 12.6% acetone | 26.8 | 70–75 | 0.4 |
| 13 | Triton X305 | N | 14.7% acetone | 6.5 | 65–75 | 0.8 |
| 14 | Catanac SN | C | 12.6% methanol | 25.0 | 65–70 | 0.4 |
| 15 | do | C | 12.6% acetone | 26.0 | 65–70 | 0.4 |
| 16 | do | C | 12.6% methanol |  | 65–70 | 0.4 |

Constants:
1. Catalyst $(NH_4)_2S_2O_8$.
2. One hour purge with argon, as heat to temperature.
3. Catalyst added at one hour intervals in 0.4 percent increments.
4. Stirring speed, 200 r.p.m.

The polymers illustrated in the above table showed oil and water repellent properties.

The following table illustrates a series of polymers of our invention prepared using a low solids polymerization technique.

In addition to the polymers illustrated in the above tables, we have made copolymers of our monomer with many other copolymerizable monomers. Examples of some of the copolymerizable monomers which we have utilized are acrylic acid, methacrylic acid, acrylamide, N-methylol acrylamide, ethyl acrylate, methyl methacrylate and lauryl methacrylate. The composition of these polymers ranged from 10 percent to about 90 percent by weight of the unsaturated fluorinated acrylate monomer with the remaining portion being one or more of the above-mentioned monomers.

We claim:

1. The composition represented by the formula

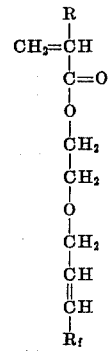

where "R" is H or $CH_3$ and "$R_f$" is a perfluorinated alkyl group of three to 14 carbon atoms.

2. A homopolymer represented by the repeating group

TABLE 4.—LOW SOLIDS POLYMERIZATION OF OLEFIN ACRYLATE

| Example | Surfactant | Surfactant type | Percent solids | Appearance | Oil repellency 5 | 2.5 | 1.3 | 0.6 | Water repellency 5 | 2.5 | 1.3 | 0.6 |
|---|---|---|---|---|---|---|---|---|---|---|---|---|
| 17 | Triton X165 | N | 5.2 | Pale blue | 5 | 5 | 5 | 4 | E | E | G | E |
| 18 | do | N | 5.8 | do | 5 | 4 | 4 | 2 | E | E | G | F |
| 19 | do | N | 4.8 | do | −4 | 2 | 2 | 0 | E | G | E | F |
| 20 | do | N | 4.6 | do | −5 | 4 | 3 | 2 | E | G | F | F |
| 21 | do | N | 5.4 | do | +4 | 4 | 2 | −1 | E | G | F | F |
| 22 | Triton X100 | N | 10.7 | do | 5 | 4 | 3 | 0 | E | E | E | G |

Constants:
1. Twenty percent of surfactant indicated.
2. Acetone present (42 percent on monomer).
3. Catalyst $(NH_4)_2S_2O_8$ (6 percent on monomer).
4. One hour purge as heat to temperature.
5. Temperature 60–65° C.

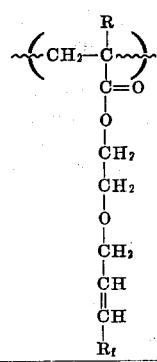
where "R" is H or CH₃ and "R_f" is perfluorinated alkyl group of three to 14 carbon atoms.
3. A copolymer containing from about 10 to about 90 percent by weight of the repeating unit represented by the following formula
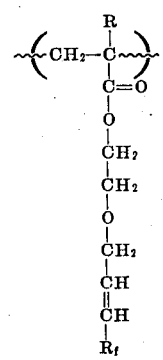
where "R" is H or CH₃ and "R_f" is a perfluorinated alkyl group of three to 14 carbon atoms.
* * * * *

UNITED STATES PATENT OFFICE
CERTIFICATE OF CORRECTION

Patent No. __3,625,929__  Dated __December 7, 1971__

Inventor(s) __Eugene C. Stump, Jr. et al__

It is certified that error appears in the above-identified patent and that said Letters Patent are hereby corrected as shown below:

Column 2, line 29, of the (III) formula - The CCOH group appearing just before the yeuld sign should read:

$$\begin{array}{c} RO \\ | \ \| \\ =CCOH \end{array} \longrightarrow$$

column 3, line 64, cancel "were acetate"; column 8, line 48, cancel "into" and insert -- in --; columns 11 and 12, the parenthetical portion of the formulas should read:

$$-\!\!\left(\!\!-CH_2 - \underset{|}{\overset{R}{C}}H\!\!\right)\!\!-$$

Signed and sealed this 12th day of December 1972.

(SEAL)
Attest:

EDWARD M. FLETCHER, JR.  
Attesting Officer

ROBERT GOTTSCHALK  
Commissioner of Patents